(12) United States Patent  
Ezrielev et al.

(10) Patent No.: US 12,032,612 B2
(45) Date of Patent: Jul. 9, 2024

(54) SYSTEM AND METHOD FOR MANAGING STORAGE AND USE OF BIOSYSTEM ON A CHIP DATA

(71) Applicant: Dell Products L.P., Round Rock, TX (US)

(72) Inventors: Ofir Ezrielev, Be'er Sheva (IL); Amihai Savir, Newton, MA (US); Avitan Gefen, Lehavim (IL); Nicole Reineke, Northborough, MA (US)

(73) Assignee: Dell Products L.P., Round Rock, TX (US)

( * ) Notice: Subject to any disclaimer, the term of this patent is extended or adjusted under 35 U.S.C. 154(b) by 130 days.

(21) Appl. No.: 17/872,969

(22) Filed: Jul. 25, 2022

(65) Prior Publication Data

US 2024/0028628 A1    Jan. 25, 2024

(51) Int. Cl.
    *G06F 16/33*    (2019.01)
(52) U.S. Cl.
    CPC .................. *G06F 16/334* (2019.01)
(58) Field of Classification Search
    CPC ..................................................... G06F 16/334
    See application file for complete search history.

(56) References Cited

U.S. PATENT DOCUMENTS

| 6,246,804 | B1 | 6/2001 | Sato et al. |
| 10,109,051 | B1 | 10/2018 | Natesh et al. |
| 11,030,726 | B1 | 6/2021 | Minor |
| 2007/0064981 | A1 | 3/2007 | Meijer |
| 2007/0071681 | A1* | 3/2007 | Gadkar ............... G16B 5/00 424/9.2 |
| 2007/0076961 | A1 | 4/2007 | Shiiyama |
| 2008/0222113 | A1 | 9/2008 | Baba et al. |
| 2008/0263466 | A1 | 10/2008 | Gadeib |
| 2011/0153351 | A1 | 6/2011 | Vesper et al. |
| 2011/0208716 | A1 | 8/2011 | Liu et al. |
| 2015/0278249 | A1 | 10/2015 | Akiyama et al. |
| 2017/0352162 | A1 | 12/2017 | Ruan et al. |
| 2019/0045207 | A1 | 2/2019 | Chen et al. |

(Continued)

OTHER PUBLICATIONS

Goodfellow, Ian J., et al. "Generative Adversarial Nets", Departement d'informatique et de recherche operationnelle, Universite de Montreal, Montreal, QC H3C 3J7, Canada. arXiv:1406.2661v1 [stat.ML] Jun. 10, 2014. 9 pages.

(Continued)

*Primary Examiner* — Mark D Featherstone
*Assistant Examiner* — Ranjit P Doraiswamy
(74) *Attorney, Agent, or Firm* — Womble Bond Dickinson (US) LLP

(57) ABSTRACT

Methods and systems for storing and managing biosystem on a chip data disclosed. To store the data, operation data from the biosystem on a chip may be stored in a database. To manage use of the stored data, a graph representation of the biosystem on a chip. The nodes of the graph representation may correspond to the architectural features of the biosystem on a chip. The edges between the nodes may be based on whether the corresponding architectural features are in communication with one another. Each of the nodes may be associated with pointers that point to portions of the operation data in the database that is relevant to the architecture feature associated with the respective node.

20 Claims, 11 Drawing Sheets

(56) References Cited

U.S. PATENT DOCUMENTS

| | | | |
|---|---|---|---|
| 2020/0411164 A1 | 12/2020 | Donner | |
| 2021/0365457 A1* | 11/2021 | Venema | G06F 16/248 |
| 2022/0140840 A1 | 5/2022 | Wang et al. | |
| 2022/0181005 A1 | 6/2022 | Narvaez | |
| 2022/0284118 A1 | 9/2022 | Kaul et al. | |
| 2022/0319673 A1 | 10/2022 | Bao | |
| 2023/0206447 A1 | 6/2023 | Kobayashi et al. | |
| 2023/0244950 A1* | 8/2023 | Neil | G06N 3/092 706/25 |

OTHER PUBLICATIONS

Radford, Alec, et al. "Unsupervised Representation Learning with Deep Convolutional Generative Adversarial Networks", indico Research, Boston, MA. Under review as a conference paper at ICLR 2016. arXiv:1511.06434v2 [cs.LG] Jan. 7, 2016. 16 pages.

Goodfellow, Ian, "NIPS 2016 Tutorial: Generative Adversarial Networks", OpenAI. arXiv:1701.00160v4 [cs.LG] Apr. 3, 2017. 57 pages.

Allwardt, Vanessa, et al. "Translational Roadmap for the Organs-on-a-Chip Industry toward Broad Adoption", Bioengineering 2020, 7, 112; Sep. 16, 2020. 27 pages.

Kilic, Tugba, et al. "Organs-on-chip monitoring: sensors and other strategies", Microphysiological Systems, 2018; 2:5; Sep. 5, 2018. 32 pages.

"Causal Discovery from Spatio-Temporal Data with Applications to Climate Science", Ebert-Uphoff, Imme, School of Electrical and Computer Engineering, Colorado State University, Fort Collins, CO; and Deng, Yi, School of Earth and Atmospheric Sciences, Georgia Institute of Technology, Atlanta, GA. Dec. 2014. 8 pages.

Zen Microscopy Software, "Your Complete Solution from Sample to Knowledge", Zeiss; Carl Zeiss Microscopy GmbH, 07745 Jena, Germany. Jul. 2021. 28 pages.

Zen Data Storage and Data Explorer, "Smart data management in life sciences", Zeiss; updated: Oct. 2010; Carl Zeiss Microscopy GmbH, 07745 Jena, Germany; Oct. 2020. 4 pages.

Torfi, Amirsina, et al. "Differentially Private Synthetic Medical Data Generation using Convolutional GANs", ARXIV Submission Version. arXiv:2012.11774v1 [cs.LG] Dec. 22, 2020. 13 pages.

* cited by examiner

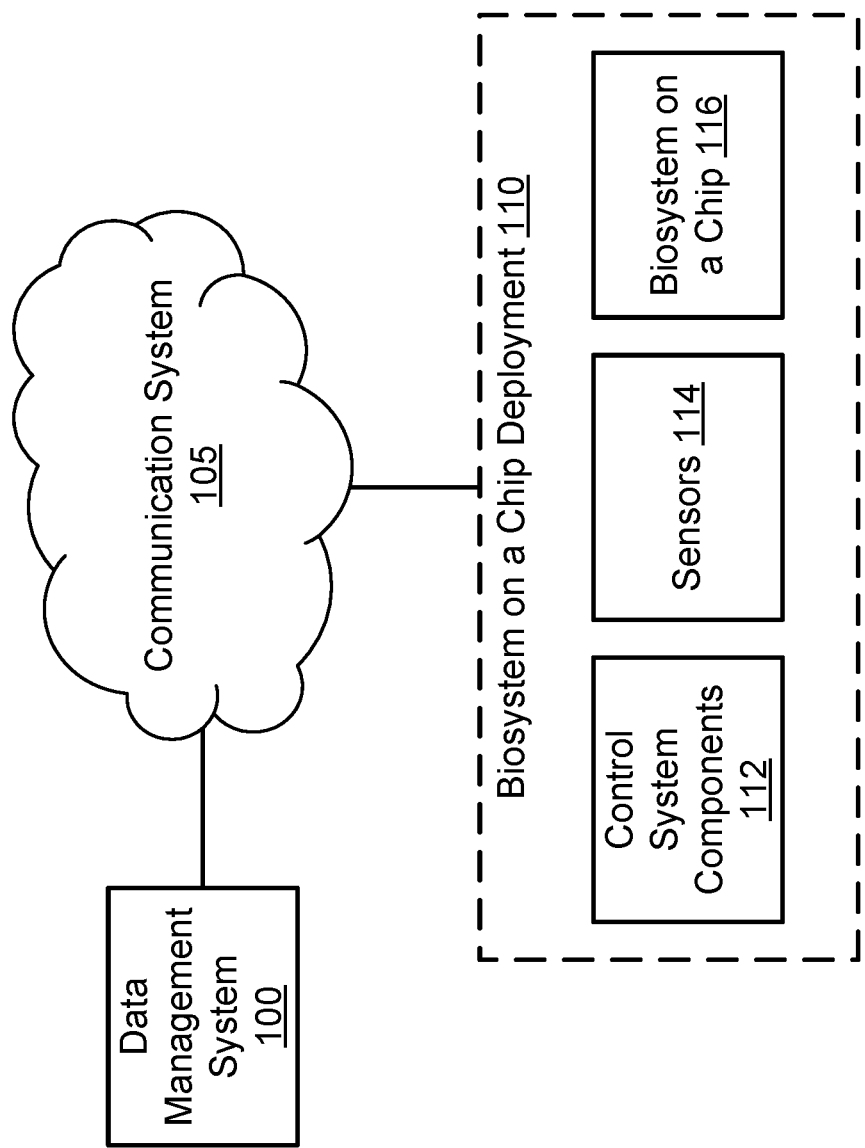

SYSTEM AND METHOD FOR MANAGING STORAGE AND USE OF BIOSYSTEM ON A CHIP DATA

FIELD

Embodiments disclosed herein relate generally to data management. More particularly, embodiments disclosed herein relate to systems and methods to manage operation data from biosystems on chips.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1A shows a block diagram illustrating a system in accordance with an embodiment.

DETAILED DESCRIPTION

Figure 1B:
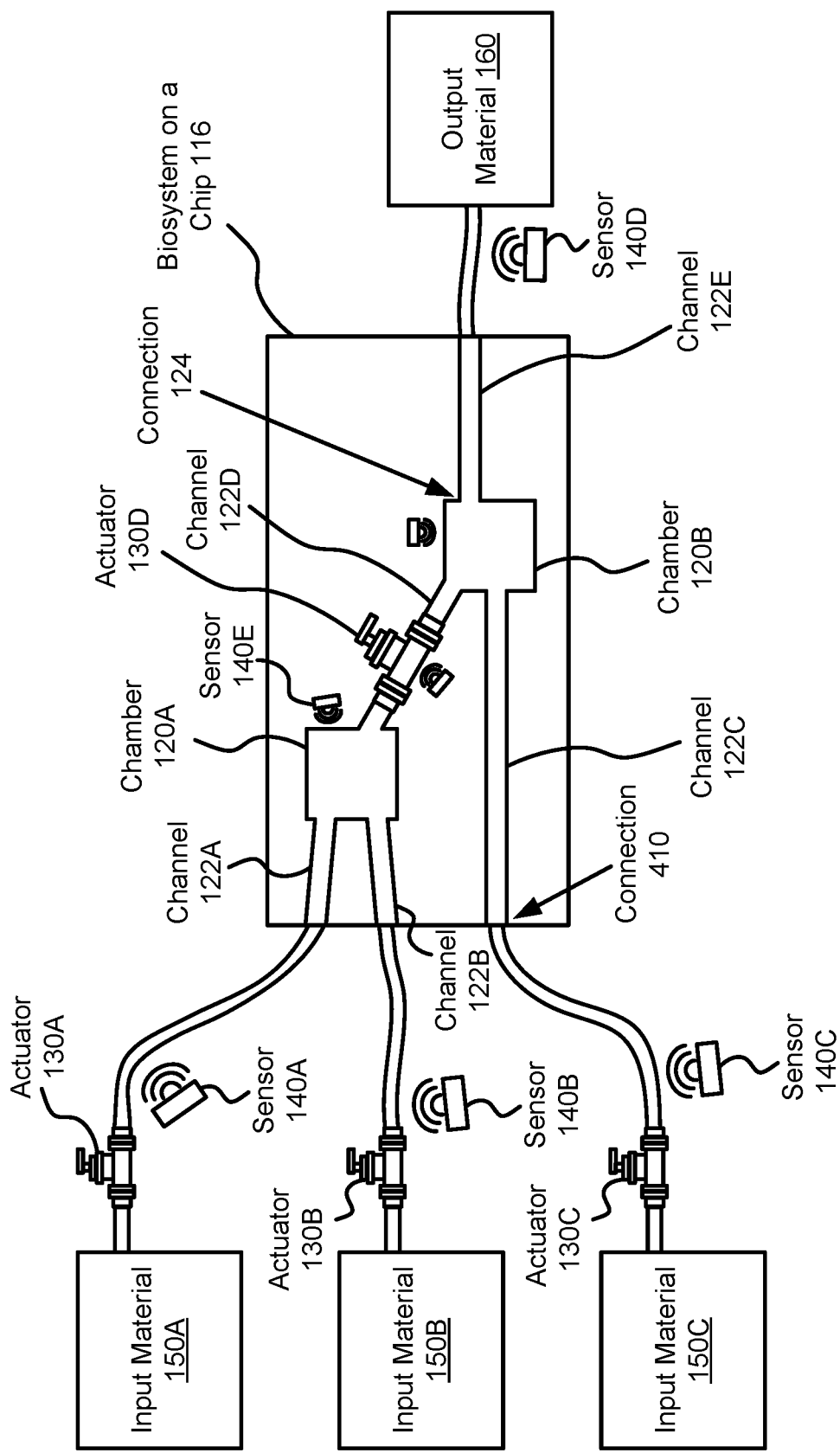
FIG. 1B shows a block diagram illustrating a biosystem on a chip deployment in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for storing and facilitating use of operation data from systems on chips (BoC). The operation data may include information regarding a process performed by one more BoCs. The operation data may be stored in a database that may include a low overhead for storage. The operation data may be stored in other types of structures such as containers that may also include low overhead by including little or no metadata.

To manage the stored operation data, a graph representation of an architecture of a BoC may be obtained. The nodes of the graph representation may be based on features of the architecture such as chambers, channels, and/or other types of structures that may guide material flow. The edges between the nodes may be based on fluid connectivity between the corresponding features of the architecture of the BoC.

Each of the nodes may include or be associated with pointers to the portions of the operation stored in the database that are relevant to the feature. Consequently, to obtain operation data relevant to a feature of the BoC, the pointers associated with the node corresponding to the features may be read and used to read the operation data (e.g., the relevant portions) from the database.

The graph representations of the BoCs may also be used to establish relationships between BoCs. For example, a metagraph based on the graph representations may be established. The nodes of the metagraph may represent the graph representations, and the quantity of edges between two nodes may represent a level of similarity of the architectures of the corresponding BoCs. Consequently, to identify a most related BoC, the numbers of edges between a node of the metagraph and other nodes may be counted, with the node corresponding to the highest number of edges being treated as being most similar.

By doing so, embodiments disclosed herein may provide a system that is able to more efficiently use limited computing resources to store and use BoC data. For example, by utilizing a graph representation based on an architecture associated with a BoC, similar operation data from BoCs with similar architectures may be identified without needing to investigate the operation associated with each of the BoCs.

In an embodiment, a method for managing operation data for biosystems on a chip (BoC) is provided. The method may include obtaining an information request for a similarity form that indicates a structure of a target BoC; generating a metagraph based on the similarity form and a repository of graph representations of a plurality of BoC, each of the graph representations be based on a structures of a corresponding one of the plurality of BoCs; identifying one of the plurality of BoCs based on edges between nodes of the metagraph as being a closest match to the similarity form; and providing a portion of operation data from a database for the identified one of the plurality of BoC to service the information request.

The structure of the corresponding one of the plurality of BoCs may include a chamber and a channel through which an input material traverses to generate an output material during operation of the one of the plurality of BoCs. The portion of the operation data may include a fluid flow characteristic (e.g., a rate, temperature, pressure, etc.) of the input material as it traverses the one of the plurality of BoCs.

Providing the portion of the operation data may include identifying a graph representation of the graph representations corresponding to the one of the plurality of BoCs; reading, from the graph representation, pointers; reading, using the pointers, the portion of the operation data from the database.

The pointers may include a first portion of the pointers that are associated with a node of the identified graph representation; and a second portion of the pointers that is associated with a second node of the identified graph representation.

The first portion of the pointers may identify first corresponding portions of the database in which a sub-portion of the portion of the operation data related to the chamber is stored, and the second portion of the pointers identify second corresponding portions of the database in which a second sub-portion of the portion of the operation data related to the channel is stored. The database may be unstructured.

Each of the graph representations may be a graph database (e.g., a data structure defining nodes and edges) that includes nodes and edges, the nodes being based on structural portions of a corresponding BoC of the plurality of BoCs, the edges being based on fluid communication capabilities between the structural portions, and each of the nodes being associated with pointers. The pointers may identify entries of the database in which sensor data from the corresponding BoC of the plurality of BoCs is stored. The pointers may further identify second entries of the database in which actuator data from the corresponding BoC of the plurality of BoCs is stored.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer-implemented services that may utilize operation data one or more Biosystems on a Chip (BoC) as part of the provided computer-implemented services.

A BoC may be a physical device that performs one or more processes to emulate and/or duplicate processes that biological systems may perform. For example, biological systems may perform various types or processes through which input materials (e.g., proteins, chemicals, etc.) may be transformed into output materials. These processes may be performed, for example, at a cellular level, at a tissue level, at an organ level, and/or at other levels of biological systems.

To operate a BoC, BoC deployment 110 may include BoC 116, control system components 112, sensors 114, and/or other components. Each of these components is discussed below.

Generally, BoC 116 may be implemented with a physical structure that includes channels, chambers, and/or other fluidic components usable to channel, store, mix, and/or otherwise direct interactions between various fluids (in which various materials may be entrained). For example, BoC 116 may be implemented with a micro-fluidic device or other types of devices that may facilitate input of various fluids, direct interaction of the input fluids and/or manage the fluids as they traverse BoC 116, and output a product or other material (e.g., such as a new material generated through flow of the input material(s) through BoC 116).

To manage the fluids, direction of the fluids, conditions to which the fluids area exposed, and/or otherwise manage BoC 116, BoC deployment 110 may include control system components 112. Control system components may include any number of devices (e.g., valves, heaters, chillers, pumps, etc.) for controlling the flow of fluids through BoC 116, the environment to which the fluids are exposed in BoC 116, and/or otherwise managing processes performed with BoC 116.

To identifying the processes occurring within BoC 116, BoC deployment 110 may include any number of sensors 114. Sensors may be positioned with control systems components 112 and/or BoC 116, and may be adapted to monitor the processes being performed with BoC 116. For example, sensors 114 may include any number of flow rate sensors, temperature sensors, pressure sensors, and/or other types of sensors. Sensors 114 may be implemented using any type of hardware devices usable to measure any number and types of characteristics of the processes performed with BoC 116.

While illustrated in FIG. 1A as being separate components, any of the components of BoC deployment 110 may be integrated (entirely or partially) with each other. Refer to FIG. 1B for additional details regarding BoC 110.

As part of its operation, BoC 110 may generate operation data. The operation data may reflect, for example, the operation of control system components 112 and sensors 114. For example, information regarding operation of a pump used to pump material into BoC 116 over time, pressures within portions of BoC 116, temperatures within the portions of BoC 116, and/or other types of information may be generated. This information may be usable, for example, to guide subsequent use of BoC deployment 110, use of other BoCs (not shown) or BoC deployments (not shown), and/or for other purposes.

For example, a downstream consumer (e.g., a researcher using an application) that may wish to implement a particular process may desire to review operation data from BoC systems to ascertain whether the process may be implemented using the BoC systems. Similarly, due to the complexity of operating BoC based systems, a downstream consumer may wish to ascertain whether a similar process has been performed in the past using a BoC. If the operation data for the previously performed processes is available, then the downstream consumer may use the operation data (rather than performing a new process with a BoC) as a substitute for a new process or to guide performance of a new process using a BoC.

In general, embodiments disclosed herein may provide methods, systems, and/or devices for managing storage and use of operation data for BoC based systems. To manage storage and use of the operation data, the system of FIG. 1A may include data management system 100. Data management system 100 may manage storage of BoC based system operation data, facilitate comparison between different BoC systems (which may use different BoCs having different architectures), and facilitate use of the stored operation data. To do so, data management system 100 may (i) store operation data for BoC systems in a database, which may be unstructured, (ii) obtain graph representations for the BoC systems, (iii) link the graph representations (or portions thereof) to portions of the database in which operation data for a corresponding BoC based system is stored, and/or (iv) facilitate comparison between different BoC based systems through generation and use of metagraphs based on the graph representations of the BoCs. By doing so, embodiments disclosed herein may provide a system capable of managing large amounts of operation data from BoC based systems in a manner that better facilitates subsequent use of the BoC based system operation data (e.g., when compared to only storing the operation data in a database).

Refer to FIGS. 2A-2D for additional details regarding the functionality of data management system 100.

Figure 3A:
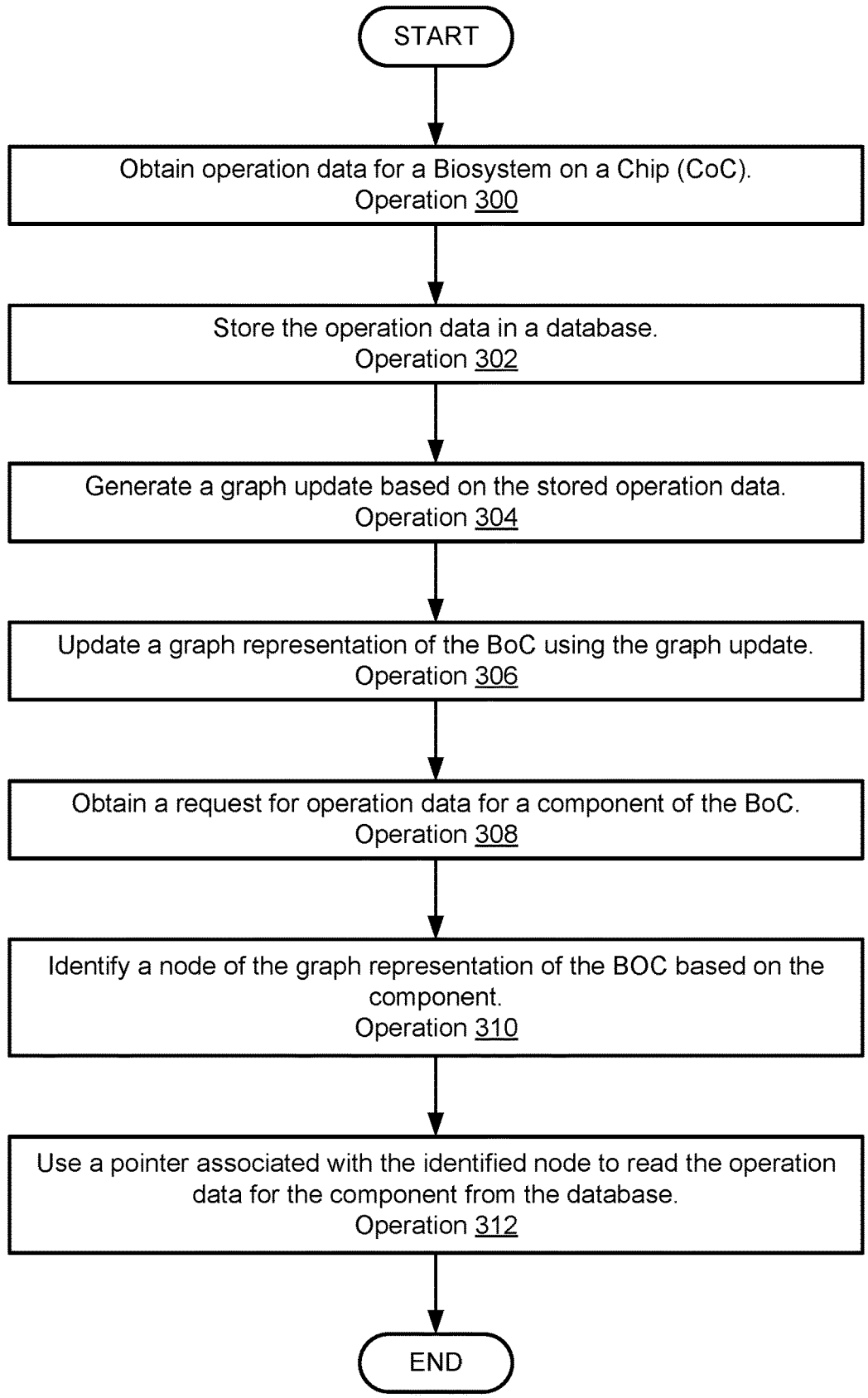
FIG. 3A shows a flow diagram illustrating a method of storing and using data in accordance with an embodiment.
Figure 3B:
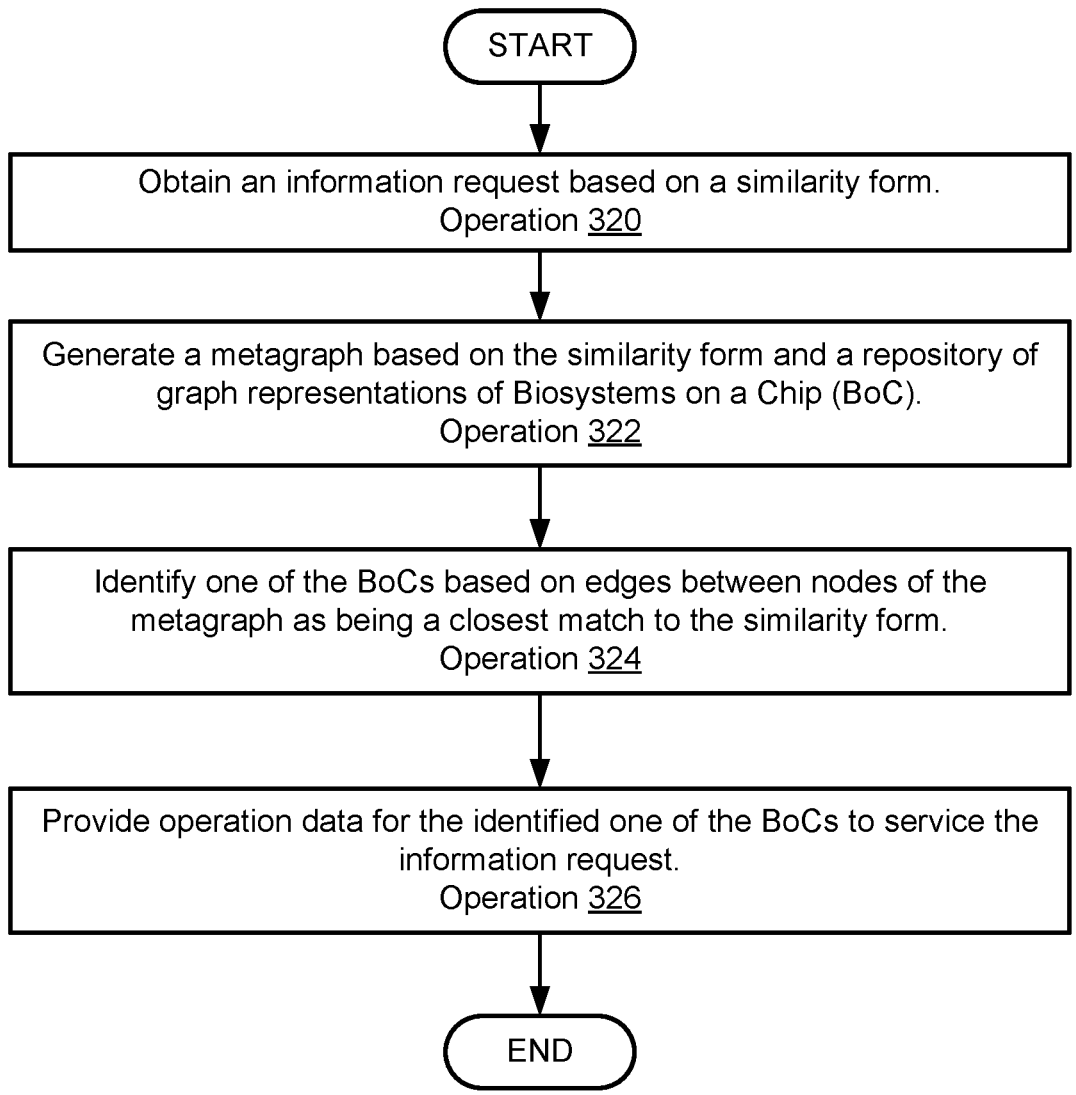
FIG. 3B shows a flow diagram illustrating a method of servicing information requests in accordance with an embodiment.

When performing their functionality, one or more of data management system 100 and BoC deployment 110 may perform all, or a portion, of the methods and/or actions shown in FIGS. 3A-3B.

Any of data management system 100 and BoC deployment 110 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, data management system 100 is implemented with multiple computing devices. For example, some of the computing devices may provide data storage services while other computing devices may provide services related to identifying similarities and/or differences of various BoC based systems.

Any of the components illustrated in FIG. 1A may be operably connected to each other (and/or components not illustrated) with a communication system (e.g., 105).

In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

Turning to FIG. 1B, a diagram of an example instance of BoC deployment 110 in accordance with an embodiment is shown. As discussed above BoC deployment 110 may implement a process to generate one or more output materials, such as output material 160. Output material 160 may be a desired product such as, for example, a protein or another type of material.

To generate output materials, BoC deployment 110 may include BoC 116. In FIG. 1B, a top view of BoC 116 is shown. BoC 116 may include a body in which any number of chambers (e.g., 120A-120B), channels (e.g., 122A-122E), and/or other types of features (not shown) are positioned. These chambers and channels may facilitate, for example, completion of chemical reactions that may transform one or more input materials (e.g., 150A-150C) into one or more output materials (e.g., 160).

A chamber may be a cavity or other space within the body of BoC 116. For example, BoC 116 may be implemented by starting with a block of material (e.g., a sheet) and removing some of the material to form chambers. A cover or other structure may be positioned to close the top portions of the chambers. While shown in FIG. 1B as including two chambers 120A, 120B, a BoC in accordance with an embodiment may include any number of chambers without departing from embodiments disclosed herein. The chambers may be of similar and/or different shapes/sizes.

A channel may be a cavity or other space within the body of BoC 116 that connects chambers to other chambers, input or output ports, and/or other structures. For example, BoC 116 may be implemented by starting with a block of material (e.g., a sheet) and removing some of the material to form the channels. A cover or other structure may be positioned to close the top portions of the channels. While shown in FIG. 1B as including five channels 122A-122E, a BoC in accordance with an embodiment may include any number of channels without departing from embodiments disclosed herein. The channels may be of similar and/or different shapes/sizes, and may connect similar or different other portions of BoC 116.

To manage the processes performed with BoC 116, control system components 112 of BoC deployment may any number of actuators (e.g., 130A-130D). The actuators may manage flow of materials through BoC 116. For example, the actuators may include valves, pumps, and/or other types of flow control components, which may be computerized thereby allowing for computer control of the flow of materials through BoC 116. While not shown in FIG. 1B, control system components 112 may include other types of components such as, for example, heating elements, cooling elements, and/or other types of devices that may manage flows of material and/or environmental conditions presented to the materials.

To manage the processes performed with BoC 116, sensors 114 of BoC deployment 110 may include any number of sensors (140A-140E, others shown in FIG. 1B are not numbered for readability). These sensors may obtain data regarding the process performed with BoC 116 such as, for example, flowrates of materials, temperatures/pressures of materials at various locations in BoC 116, and/or other characteristics of the process performed with BoC 116.

Any of sensors 114 and control system components 112 may be positioned with or outside of BoC 116. For example, some of these components may be integrated into BoC 116 while other may be positioned outside of BoC 116.

As seen in FIG. 1B, control data for control system components 112 and sensor measurements from sensors 114 may be obtained during operation of BoC 116. This information (e.g., "operation data") may be stored for future use in a manner that facilitates its future. As will be discussed below, a combination of graph representations and databases may be used to store the operation data and facilitate use of the operation data. Turning to FIGS. 2A-4D, data flow and data structure diagrams in accordance with an embodiment are shown.

Figure 2A:
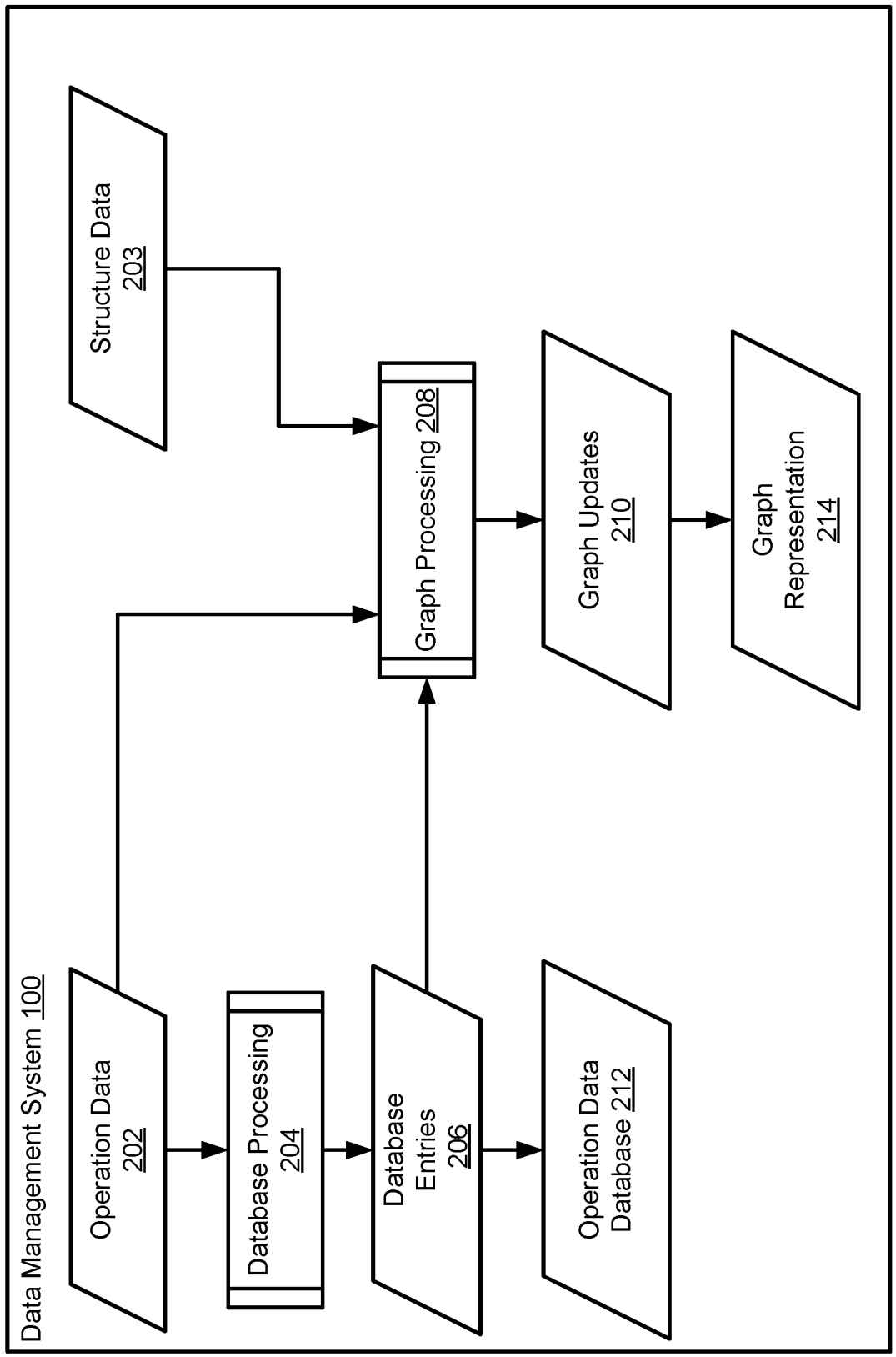
FIG. 2A shows a block diagram illustrating a first data flow in accordance with an embodiment.

FIG. 2A shows a data flow diagram in accordance with an embodiment. Operation data 202 may be generated during operation of a BoC, and structure data 203 may include information regarding the architecture of the BoC that performed the process. To manage and use operation data 202 in the future, operation data 202 and structure data 203 may be used to store the various portions of operation data 202 in a manner that facilitates ease of use in the future while managing cost for storing the portions.

To do so, operation data 202 may be subjected to database processing 204 to generate database entries 206 in which portions of operation data 202 may be stored. For example, the portions may correspond to sensor measurements (e.g., over the duration of the process) and/or control data used to operate actuators and/or other components. Once generated, database entries 206 may be added to operation data database 212.

Generally, operation data database 212 may be implemented with a low computational overhead architecture such as, for example, an unstructured database. For example, the database entries 206 may simply be stored without generating significant metadata and/or other types of indexing data. By doing so, the operation may be efficiently stored, but may limit search functionality for operation data database 212.

To facilitate searching of operation data 202 and/or comparison between the BoC and other BoCs, operation data 202, structure data 203, and/or database entries 206 may be subjected to graph processing 208. Graph processing may generate a graph representation and/or updates to an existing graph representation (e.g., 210) of the structure (e.g., architecture) of the BoC. For example, graph representation 214 may include nodes corresponding to chambers and channels of the BoC, and the edges between the nodes may correspond to connections (e.g., 124) between these portions of the BoC.

Additionally, each of the nodes may be associated with pointers to the database entries 206 that include operation data associated with the corresponding component of BoC. In this manner, to identify operation data associated with a particular component of a BoC, the corresponding node (e.g., which may include a label or other association indicator) may be identified in the graph representations. The associated pointers for the identified node may identify the entries of operation data database 212 in which the operation data is stored.

Figure 2B:
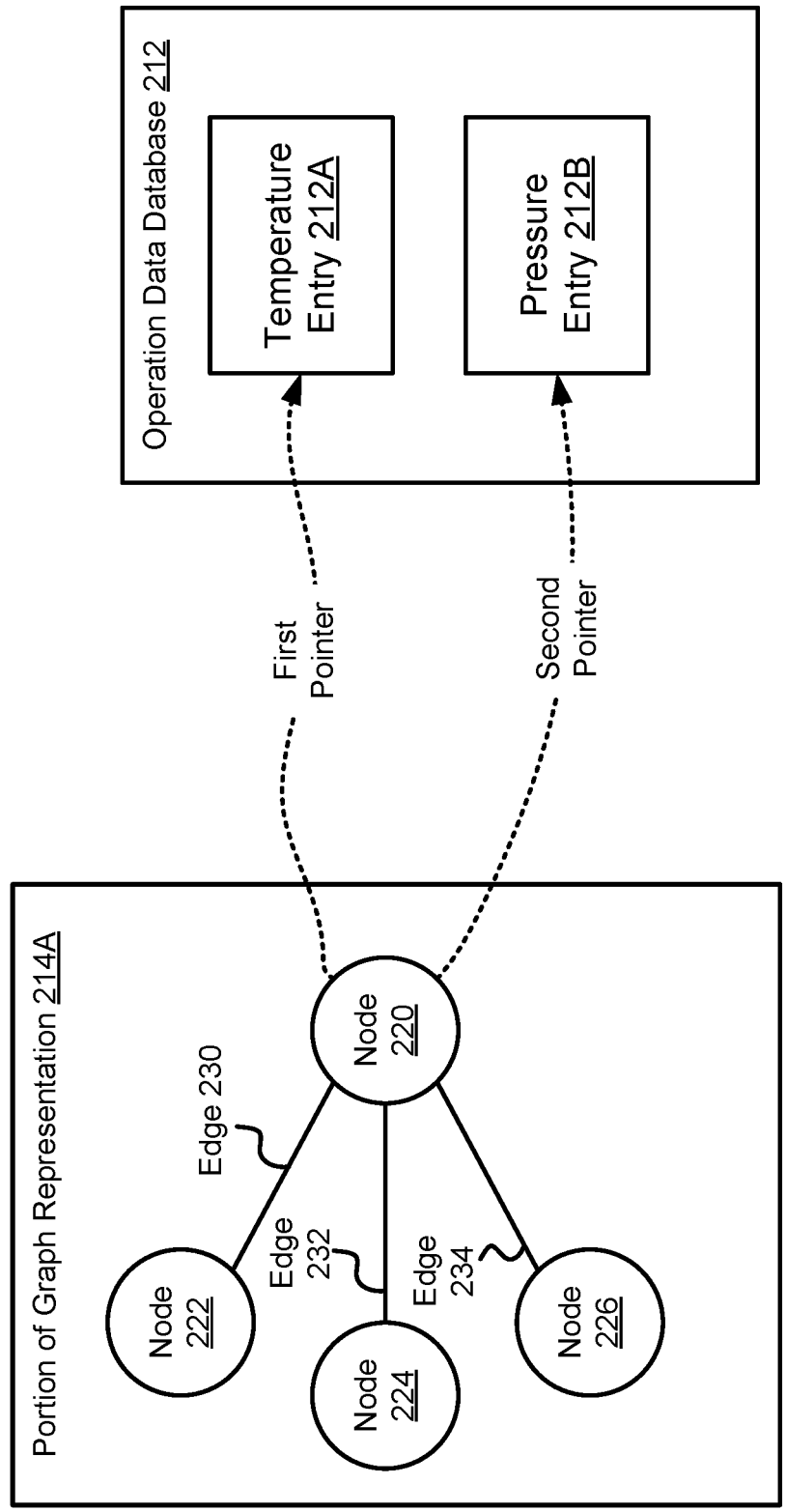
FIG. 2B show block diagrams illustrating a first data structure in accordance with an embodiment.

Turning to FIG. 2B, a data structure diagram in accordance with an embodiment is shown. In FIG. 2B, a portion of graph representation 214A corresponding to a chamber and three channels of a BoC is shown. Node 220 may correspond to the chamber while the other nodes 222-226 may correspond to the channels. Edges 230, 232, 234 between the nodes indicate the fluidic connections between these structures of the BoC. Thus, in this example, edges 230-234 indicate that each of the channels connects to the chamber associated with node 220.

Node 220 may also include or have associated with it any number of pointers that point to operation data of operation data database 212 associated with the chamber. In this example, node 220 is associated with two pointers that point to two entry 212A-212B of operation data database 212. These entries include measurements of pressure and temperature of the fluids within the chamber during operation of the BoC.

In an embodiment, the operation data for each component is stored as part of information for a corresponding node (e.g., part of the graph representation).

While shown in FIG. 2B with a limited number of nodes, pointers, and edges, it will be understood that these data structures may include any number of these components without departing from embodiments disclosed herein.

Figure 2C:
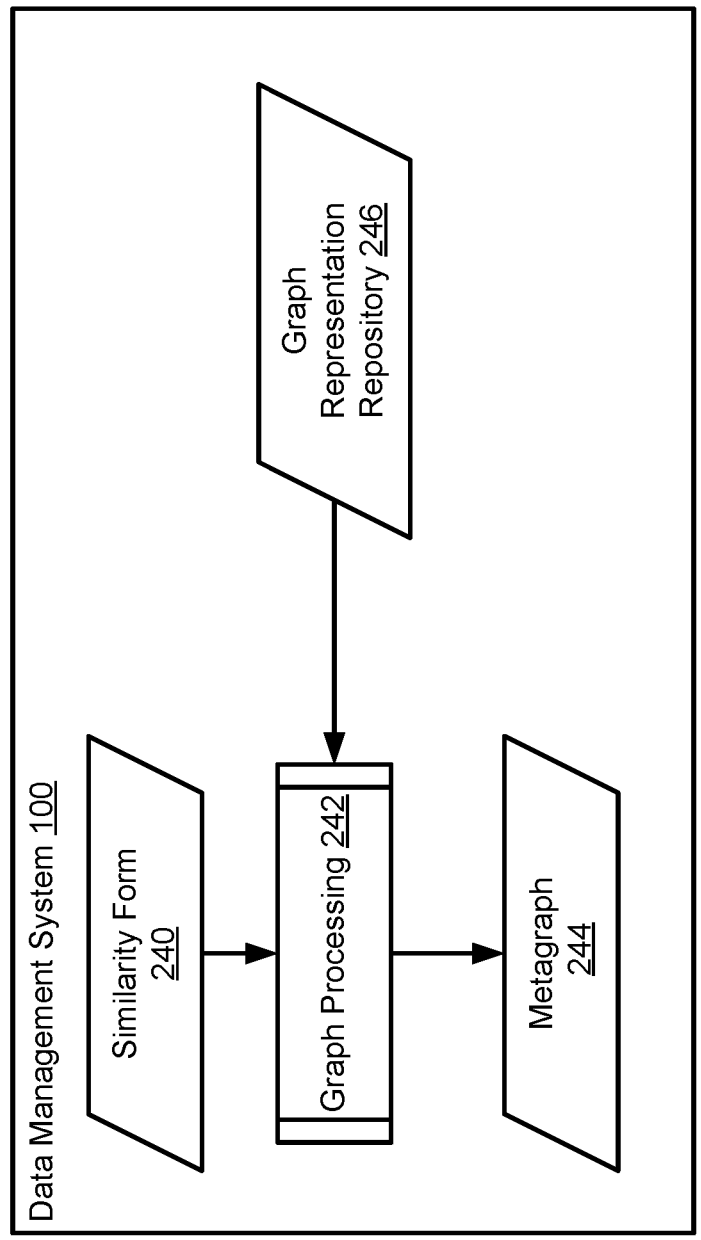
FIG. 2C shows a block diagram illustrating a second data flow in accordance with an embodiment.

Turning to FIG. 2C, a data flow diagram in accordance with an embodiment is shown. Once the data structures illustrated in FIG. 2B are obtained, the data structures may be used to facilitate use of BoC system data. To do so, for example, a user interested in identifying similar BoC systems may submit a similarity form 240. The similarity form may define a hypothetical architecture of BoC system, including the numbers and arrangements of chambers, channels, and/or other features of the hypothetical BoC system.

Once submitted, similarity form 240 may be subject to graph processing 242, which may also use any number of graph representations of BoC systems as input. The graph representations of the BoC systems may be stored in a repository, such as graph representation repository 246.

The graph processing 242 may generate metagraph 244. Metagraph 244 may be a graph representation of the similarities between the similarity form and the other BoCs.

Metagraph 244 may include any number of nodes corresponding to each of the BoC systems for which graph representations are available, and the similarity form. The edges of the nodes may indicate the level of similarity between the similarity form and the BoCs. For example, larger numbers of edges and/or weights of the edges between two nodes may indicate a higher level of similarity between the nodes. Thus, to identify a BoC most similar to similarity form 240, the numbers of edges and/or weights of the edges between the node of metagraph 244 corresponding to the similarity form and each other node. The other node connected to the node corresponding to the similarity form by the largest number of edges may be the most closely related, architecturally to similarity form 240.

Additionally, in an embodiment, different edges may represent the similarity of different characteristics (e.g., indicated by the weights of the corresponding edges) of two graph representations and corresponding architectures of BoCs. For example, a first edge may represent a similarity between the quantity of nodes in two graph representations, and a second edge may represent a similarity between the average number of edges between the nodes in the two graph representations. For highly dissimilar characteristics, edges may not even be added to further convey the differences in architectures of BoCs. By doing so, metagraph 244 may be filterable based on the type of similarity a user may wish to investigate. For example, in FIG. 2D, if a user wished to investigate similarity levels of numbers of nodes, all of the first edges 260 associated with other characteristics may be removed to provide a visual indication with respect to the level of similarity between the number of nodes of the similarity form and the graph representation of the first BoC. The weight of the remaining edge (e.g., thickness) may convey the level of similarity regarding that specific characteristic of the architectures of the similarity form and the first BoC.

Figure 2D:
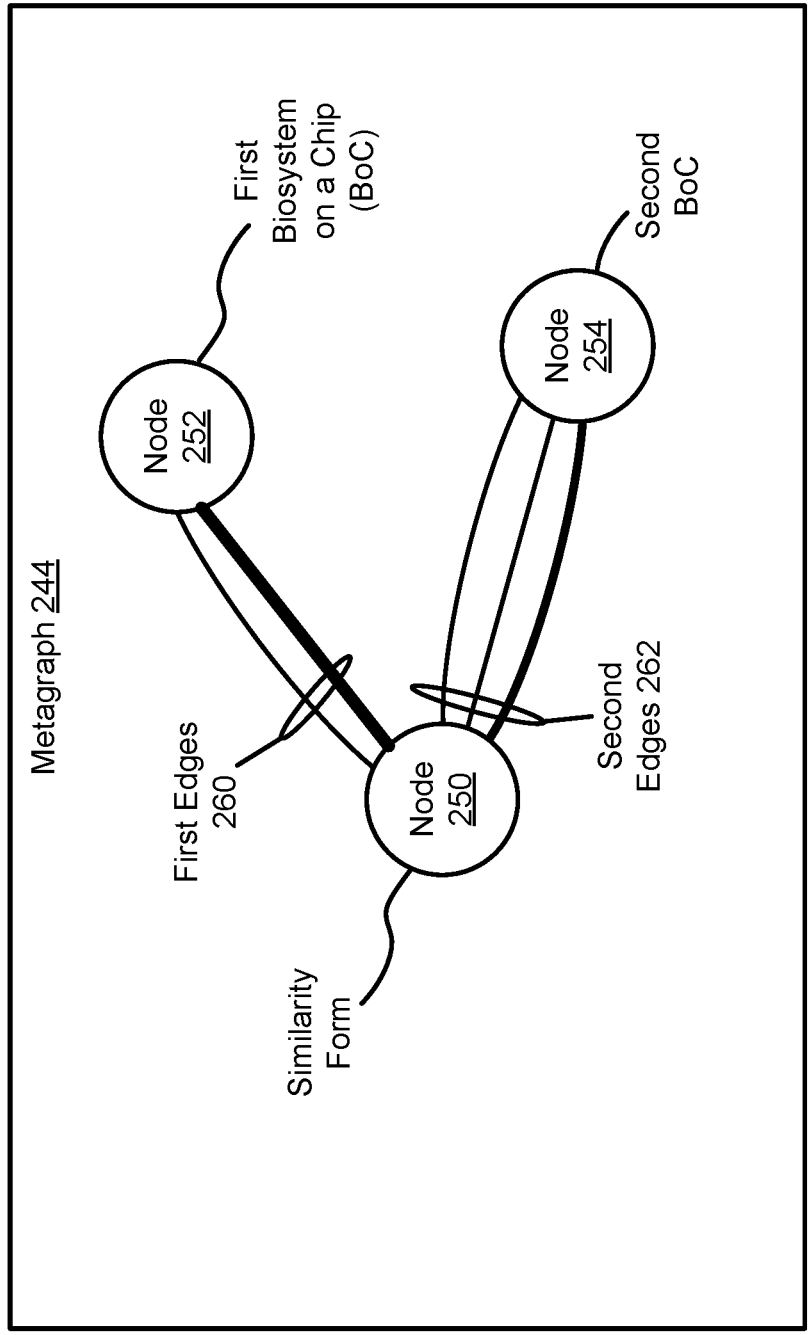
FIG. 2D show block diagrams illustrating a second data structure in accordance with an embodiment.

Turning to FIG. 2D, a data structure diagram in accordance with an embodiment is shown. In FIG. 2D, an example of metagraph 244 is shown for a similarity form and two BoCs.

As seen in FIG. 2D, metagraph 244 may include three nodes 250, 252, 254. Node 250 may correspond to the similarity form, while the other nodes 252, 254 may correspond to two different BoCs having different architectures.

First edges 260 between node 250 and node 252 may indicate a level of similarity between the architecture specified by the similarity form and the first BoC. Second edges 262 between node 250 and node 254 may indicate a level of similarity between the architecture specified by the similarity form and the second BoC.

As seen in FIG. 2D, in this example, first edges 260 may include two edges and second edges 262 may include three edges. Thus, in this example, it may be concluded that second BoC is more similar to the similarity form than the first BoC.

However, while illustrated in this example with multiple edges representing similarity, as noted above, weights of the edges may be used (in conjunction with and/or alternatively to multiple edges) to represent the level of similarity and/or similarity levels with respect to certain characteristics of the architectures of multiple BoCs. For example, any two nodes may be connected with a single edge that has a weight (e.g., graphically this could be a thickness of a line representing the edge in a depiction of metagraph 244, may represent an overall similarity) and/or multiple edges that may represent the similarity of different characteristics of two BoC architectures.

The edges between the nodes may be identified through pattern matching, graph analysis, inferencing, or other means. For example, the architecture specified by the similarity form may be transformed into (or used as a basis for) a graph representation and compared to the graph representation of the architecture of the first BoC and the second BoC. Similar node and edge patterns in each graph representation may give rise to edges between the corresponding nodes of metagraph 244. The edges of metagraph 244 may be added when, for example, a graph representation of a similarity form and a graph representation of a BoC include a same node with a same edge pattern about the node. Thus, in an embodiment, the number of edges that may be present between nodes of metagraph 244 may be up to the number of nodes of the similarity form.

As discussed above, the components of FIG. 1A may perform various methods to manage and facilitate use of BoC system operation data. FIGS. 3A-3B illustrate methods that may be performed by the components of FIG. 1A. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of storing and using BoC data in accordance with an embodiment is shown. The method may be performed by a data management system or a data processing system.

At operation 300, operation data for a BoC is obtained. The operation data may be obtained by (i) receiving it form a BoC deployment, (ii) reading it from storage, and/or (iii) receiving it from another device. The operation data may reflect operation of the BoC.

At operation 302, the operation data is stored in a database. The operation data may be stored in the database by generating and adding entries to the database. The entries may include and/or be based on the operation data such that the operation data may be retrieved from the database. The data may not include, for example, indications of how or from where the operation data was obtained. Rather, the database may be an unstructured database.

At operation 304, a graph update is generated based on the stored operation data. The graph update may be generated by (i) generating a new graph representation for the BoC if none existed previously, and (ii) generating a change log for an existing graph representation of the BoC that updates nodes corresponding to the components of the BoC associated with various portions of the operation data. For example, pointers may be added to the nodes (or may otherwise be associated with the nodes). The pointers associated with each node may facilitate retrieval of the operation data from the data that is associated with component of the BoC associated with the node.

At operation 306, a graph representation of the BoC is updated using the graph update. The graph representation may be updated by either (i) using the new graph representation as the updated graph representation of the BoC in a case in which no graph representation of the BoC previously existed and/or (ii) applying the update change log to the existing graph representation of the BoC.

At operation 308, a request for operation data for a component of the BoC is obtained. The request may be obtained by (i) receiving it from another device, (ii) receiving it from an application, and/or (iii) obtaining user input that indicates the request. The component may be, for example, a chamber, channel, and/or other portion of the BoC.

At operation 310, a node of the graph representation of the BoC is identified based on the component. For example, an identifier of the component may be used to search the graph representation to identify the node (e.g., which may be labeled with the identifier of the component).

At operation 312, a pointer associated with the identified node is used to read the operation data for the component from the database. The pointer may be used by performing a read or lookup using the information included in the pointer. For example, the pointer may specify entries of the database. The specified entries may be read from the database, and the operation may be in the read entries of the database.

The method may end following operation 312.

Using the method illustrated in FIG. 3A, embodiments disclosed herein may facilitate storage and use of operation data from BoCs.

Turning to FIG. 3B, a flow diagram illustrating a method of using stored operation data in accordance with an embodiment is shown. The method may be performed by a data management system or a data processing system.

At operation 320, an information request based on a similarity form is obtained. The information request may specify, for example, that a type of operation data for a BoC most similar to the similarity form be provided.

At operation 322, a metagraph is generated based on the similarity form and a repository of graph representations of BoC systems. The metagraph may be generated by generating a graph representation for the architecture indicated by the similarity form. The graph representation of the similarity forms and the graph representations in the repository may be used to establish nodes (e.g., one per graph representation) of the metagraph. Edges of the metagraph may be established based on similarity between the graph representation for the similarity form and the other graph representations in the repository. Thus, the node corresponding to the graph representation of the similarity form may be connected to the other nodes of the metagraph by numbers of edges corresponding to a level of similarity between the architecture specified by the similarity form and the architectures of the BoC systems.

At operation 324, one of the BoCs is identified based on edges between the nodes of the metagraph as being a closest match to the similarity form. The one of the BoCs may be identified by counter the edges between the node corresponding to the similarity form and the other nodes. The BoC associated with the other node that is connected to the node corresponding to the similarity form with the largest number of edges may be the identified one of the BoCs.

At operation 326, operation data for the identified one of the BoCs is provided to service the information request. The operation data may be provided by identified the graph representation corresponding to the BoC, identifying one or more nodes of the identified graph representation relevant to the requested operation data, identifying pointers associated with the one or more identified nodes, and reading entries of the database using the pointers. The read entries may include the operation data.

The method may end following operation 326.

Using the method illustrated in FIG. 3B, embodiments disclosed herein may facilitate identification and use of operation data for BoCs that are similar to a target BoC architecture. By doing so, the operation data for BoCs may not need to be identified to ascertain its relevance with respect to a desired BoC architecture.

Figures 4A, 4B:
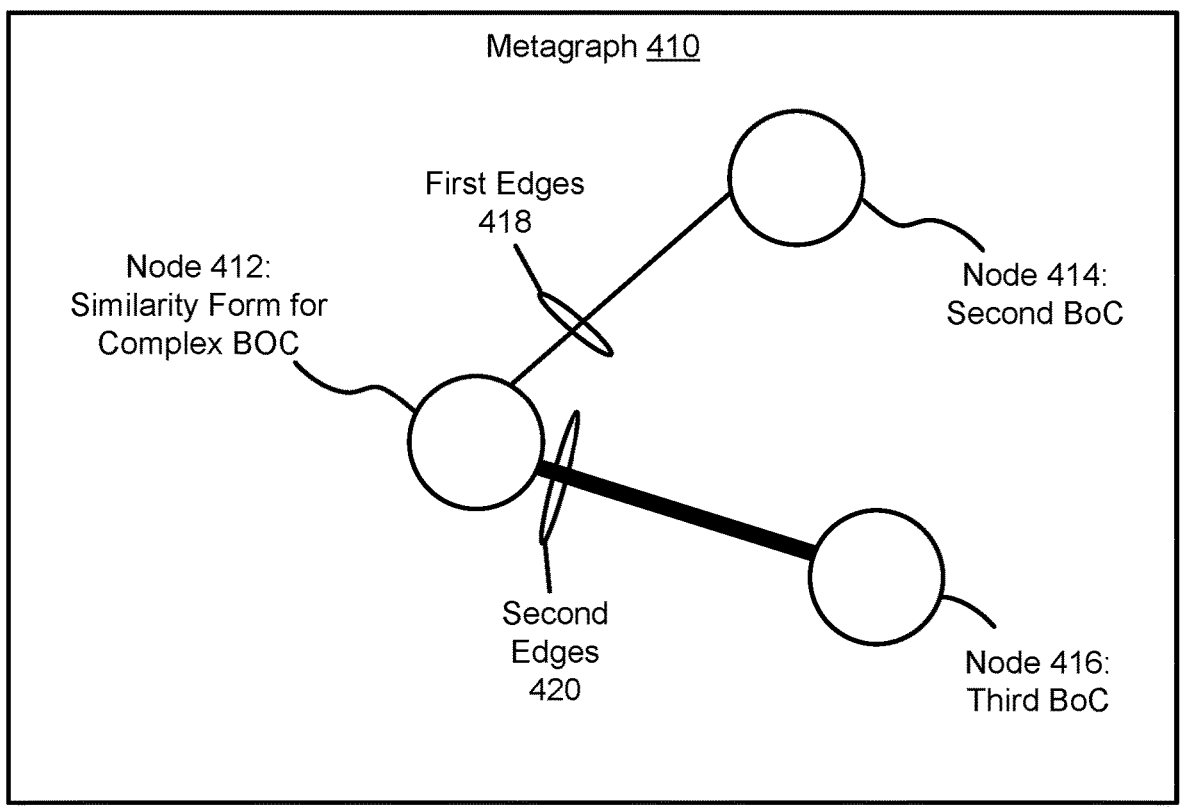
FIGS. 4A-4C show diagrams illustrating a system, operations performed thereby, and data structures used by the system over time in accordance with an embodiment.
Figure 4C:
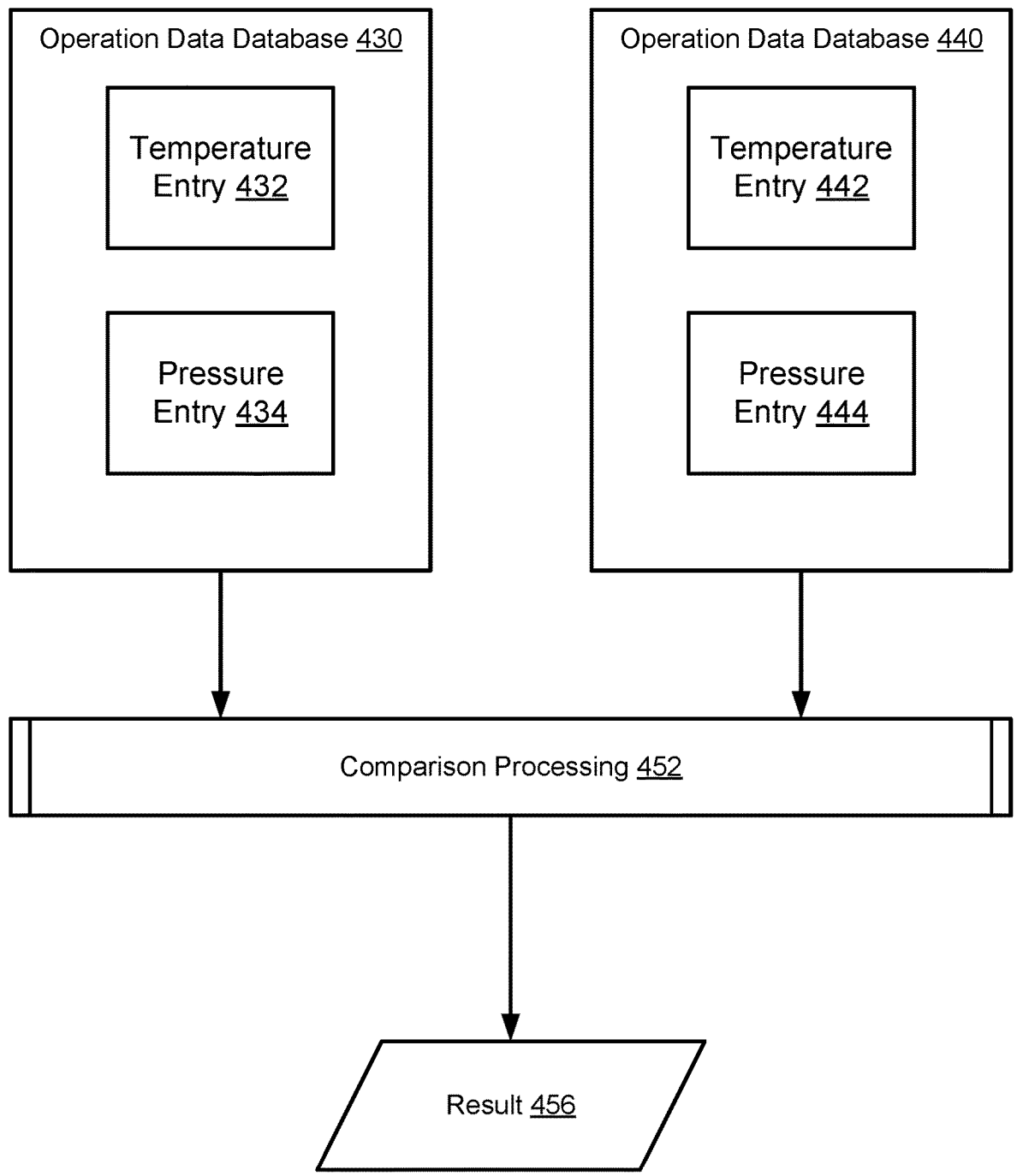

Turning to FIGS. 4A-4C, diagrams illustrating a process of using BoC operation data in accordance with an embodiment are shown.

Turning to FIG. 4A, consider a scenario in which complex BoC 400 is used to perform a process for generating a desired material. However, during operation of the BoC, usually large pressures and temperatures were measured by sensors of the BoC deployment in which complex BoC 400 resides.

Due to the complexity of operating complex BoC 400 due to the large number of input materials and time to complete the process for obtaining the desired material, a user may wish to compare the operation of complex BoC 400 to other BoCs.

To do so, the user may submit an information request along with a similarity form to a data management system. Turning to FIG. 4B, a diagram of metagraph 410 in accordance with an embodiment is shown. Metagraph 410 may be generated based on the architecture of complex BoC 400 by the user providing a similarity form with that architecture.

Once submitted, the data management system may generate metagraph 410 by establishing node 412 which corresponds to the submitted similarity form, and two other nodes 414, 416 corresponding to two other BoCs for which operation data is available.

Edges 418, 420 may be added to metagraph 410 based on the degree of similarity between the graph representations corresponding to the nodes of metagraph 410. Thus, as seen in FIG. 4B, first edges 418 between node 412 and 414, in this example, may only include a single edge that represents an overall level of similarity with weights that represent the level of overall similarity.

In this example, second edges 420 may include an edge with a heavy weight (e.g., graphically represented by the line thickness) which indicates that third BoC associated with node 416 may be more similar to complex BoC 400 than the second BoC associated with node 414 is similar to complex BoC 400. For example, the line thickness used to represent first edges 418 is smaller than that of second edges 420, thereby visually indicating that first edges 418 have a lower weight.

Based on metagraph 410, the user may identify these differences in similarity and elect to compare the operation data of complex BoC 400 with operation data from the third BoC.

Turning to FIG. 4C, a diagram of a comparison process in accordance with an embodiment is shown. As seen in FIG. 4C, to ascertain whether the operation of complex BoC 400 is unusual without needing to repeat the process, operation data from operation data database 430 and operation data database 440 may be read using pointers associated with the nodes of metagraph 410 corresponding to the complex BoC and the third BoC. In this case, two entries from each of the operation data database are read using the pointers, including temperature entry 432 and pressure entry 434 corresponding to the complex BoC and temperature entry 442 and pressure entry 434 which correspond to the third BoC.

Once read, the information from these entries may be subjected to comparison processing 452 to obtain result 456. In this example, result 456 indicates that the temperature and pressures during the processes performed by complex BoC 400 and third BoC are similar. Consequently, the user may treat the unusually high pressure and temperature measurements for the complex BoC as normal.

Thus, as illustrated in FIGS. 4A-4C, embodiments disclosed herein may provide a system for storing and using stored operation data. By storing the operation in a database, the data may be stored in a computationally and time efficient manner. Use of a graph representation to identify relevant portions of the stored operation data may then be used to discriminate relevant data form less relevant operation data.

Figure 5:
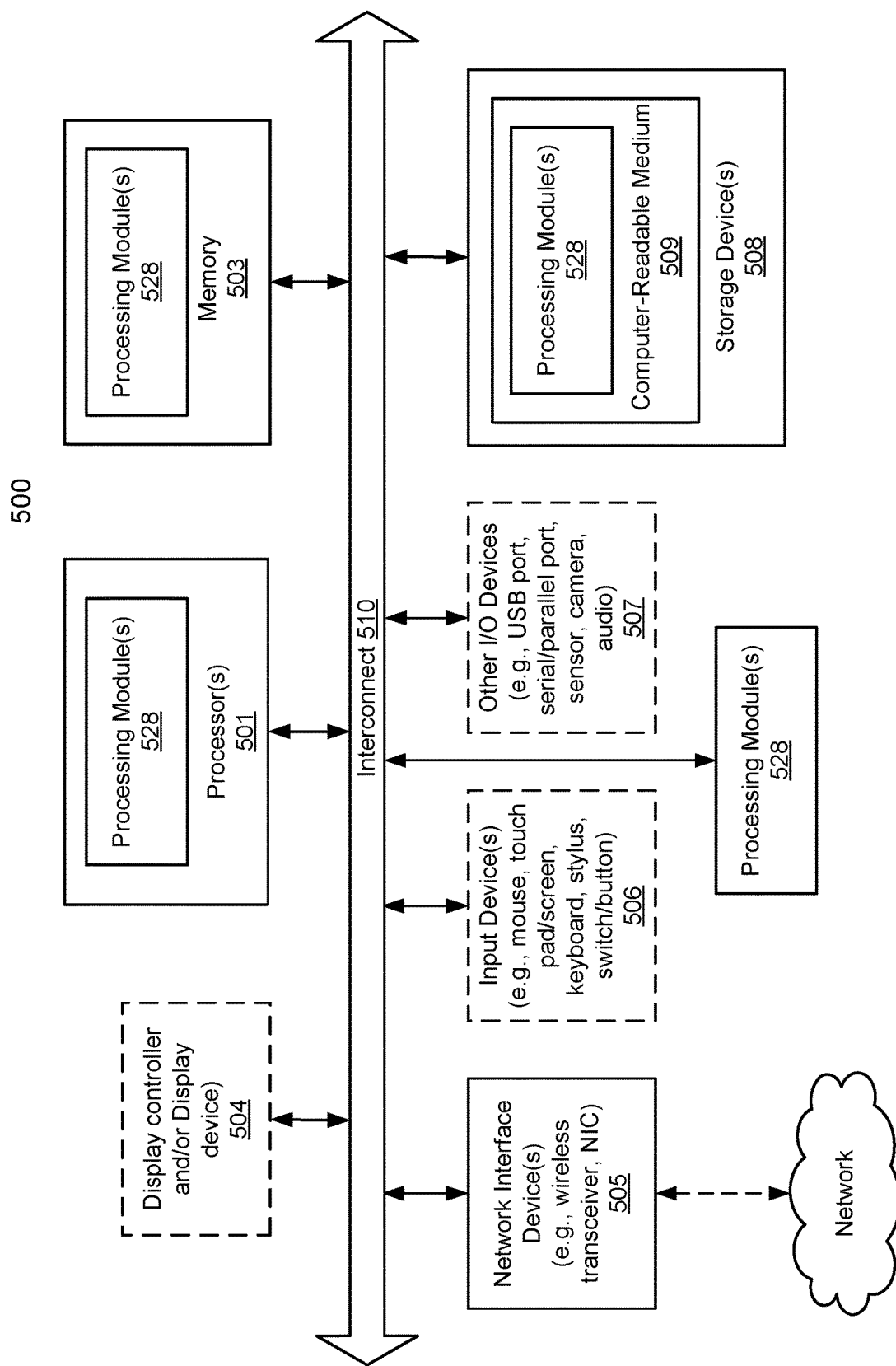
FIG. 5 shows a block diagram illustrating a data processing system in accordance with an embodiment.

Any of the components illustrated in FIGS. 1-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an image processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation data for biosystems on a chip (BoC), the method comprising:
    obtaining an information request for a similarity form that indicates a structure of a target BoC;
    generating a metagraph based on the similarity form and a repository of graph representations of a plurality of BoCs, each of the graph representations being based on a structure of a corresponding one of the plurality of BoCs, wherein the structure of each of the corresponding one of the plurality of BoCs is a physical structure that comprises a physical chamber and a physical channel;
    identifying one of the plurality of BoCs based on edges between nodes of the metagraph as being a closest match to the similarity form; and
    providing a portion of operation data from a database for the identified one of the plurality of BoCs to service the information request.

2. The method of claim 1, during operation of each of the corresponding one of the plurality of BoCs, an input material traverses through the physical chamber and the physical channel to generate an output material-during operation of the one of the plurality of BoCs.

3. The method of claim 2, wherein the portion of the operation data comprises a fluid flow characteristic of the input material.

4. The method of claim 2, wherein providing the portion of the operation data comprises:
    identifying a graph representation of the graph representations corresponding to the one of the plurality of BoCs;
    reading, from the graph representation, pointers;
    reading, using the pointers, the portion of the operation data from the database.

5. The method of claim 4, wherein the pointers comprise:
    a first portion of the pointers that are associated with a node of the identified graph representation; and
    a second portion of the pointers that is associated with a second node of the identified graph representation.

6. The method of claim 5, wherein the first portion of the pointers identify first corresponding portions of the database in which a sub-portion of the portion of the operation data related to the chamber is stored, and the second portion of the pointers identify second corresponding portions of the database in which a second sub-portion of the portion of the operation data related to the channel is stored.

7. The method of claim 6, wherein the database is unstructured.

8. The method of claim 1, wherein each of the graph representations is a graph database comprising nodes and edges, the nodes being based on structural portions of a corresponding BoC of the plurality of BoCs, the edges being based on fluid communication capabilities between the structural portions, and each of the nodes being associated with pointers.

9. The method of claim 8, wherein the pointers identify entries of the database in which sensor data from the corresponding BoC of the plurality of BoCs is stored, and wherein the pointers further identify second entries of the database in which actuator data from the corresponding BoC of the plurality of BoCs is stored.

10. A non-transitory machine-readable medium having instructions stored therein, which when executed by a processor, cause the processor to perform operations for managing operation data for biosystems on a chip (BoC), the operations comprising:
    obtaining an information request for a similarity form that indicates a structure of a target BoC;
    generating a metagraph based on the similarity form and a repository of graph representations of a plurality of BoCs, each of the graph representations being based on a structure of a corresponding one of the plurality of BoCs, wherein the structure of each of the corresponding one of the plurality of BoCs is a physical structure that comprises a physical chamber and a physical channel;

identifying one of the plurality of BoCs based on edges between nodes of the metagraph as being a closest match to the similarity form; and
providing a portion of operation data from a database for the identified one of the plurality of BoCs to service the information request.

11. The non-transitory machine-readable medium of claim 10, wherein during operation of each of the corresponding one of the plurality of BoCs, an input material traverses through the physical chamber and the physical channel to generate an output material.

12. The non-transitory machine-readable medium of claim 11, wherein the portion of the operation data comprises a fluid flow characteristic of the input material as it traverses the one of the plurality of BoCs.

13. The non-transitory machine-readable medium of claim 11, wherein providing the portion of the operation data comprises:
identifying a graph representation of the graph representations corresponding to the one of the plurality of BoCs;
reading, from the graph representation, pointers;
reading, using the pointers, the portion of the operation data from the database.

14. The non-transitory machine-readable medium of claim 13, wherein the pointers comprise:
a first portion of the pointers that are associated with a node of the identified graph representation; and
a second portion of the pointers that is associated with a second node of the identified graph representation.

15. A data processing system, comprising:
a processor; and
a memory coupled to the processor to store instructions, which when executed by the processor, cause the processor to perform operations for managing operation data for biosystems on a chip (BoC), the operations comprising:
obtaining an information request for a similarity form that indicates a structure of a target BoC;
generating a metagraph based on the similarity form and a repository of graph representations of a plurality of BoCs, each of the graph representations being based on a structure of a corresponding one of the plurality of BoCs, wherein the structure of each of the corresponding one of the plurality of BoCs is a physical structure that comprises a physical chamber and a physical channel;
identifying one of the plurality of BoCs based on edges between nodes of the metagraph as being a closest match to the similarity form; and
providing a portion of operation data from a database for the identified one of the plurality of BoCs to service the information request.

16. The data processing system of claim 15, wherein during operation of each of the corresponding one of the plurality of BoCs, an input material traverses through the physical chamber and the physical channel to generate an output material.

17. The data processing system of claim 16, wherein the portion of the operation data comprises a fluid flow characteristic of the input material as it traverses the one of the plurality of BoCs.

18. The data processing system of claim 16, wherein providing the portion of the operation data comprises:
identifying a graph representation of the graph representations corresponding to the one of the plurality of BoCs;
reading, from the graph representation, pointers;
reading, using the pointers, the portion of the operation data from the database.

19. The data processing system of claim 18, wherein the pointers comprise:
a first portion of the pointers that are associated with a node of the identified graph representation; and
a second portion of the pointers that is associated with a second node of the identified graph representation.

20. The method of claim 1, wherein each of the plurality of BoCs and the target BoC is a physical device that emulates biological processes performed by at least one selected from a group consisting of: a cell, a tissue, and an organ.

* * * * *